United States Patent Office.

ATWATER E. BROCKETT, OF BRANFORD, CONNECTICUT, ASSIGNOR TO LEMIRA H. BROCKETT, OF SAME PLACE.

PAINT FOR ROOFS, &c.

SPECIFICATION forming part of Letters Patent No. 251,676, dated December 27, 1881.

Application filed August 17, 1881. (No specimens.)

*To all whom it may concern:*

Be it known that I, ATWATER E. BROCKETT, of Branford, in the county of New Haven and State of Connecticut, have invented a certain new and Improved Paint, of which the following is a specification.

The object of this improvement is to make a strong, durable, and elastic paint, which shall stand the heat of the sun without blistering or melting, and which shall yield when the article to which it is applied expands and contracts under changes of temperature, and thereby will afford a perfect protection to the article to which it is applied.

To this end my improvement consists in a paint or a base for a paint composed of pine-tar, rosin-oil, pure caoutchouc gum, gutta-percha chips, gum-shellac, copal (oil) varnish, dammar varnish, and boiled linseed-oil, combined in certain proportions and in a manner hereinafter specified.

In carrying out my improvement I preferably proceed as follows: I take two caldron kettles. In one I heat about thirty (30) gallons of boiled linseed-oil to about the boiling-point. In the other I place about twenty-six (26) gallons of redistilled and strained pine-tar and about ten (10) gallons of rosin-oil and boil them slowly until all water is evaporated. I now raise the temperature and add about six (6) pounds of pure caoutchouc gum and about eight (8) pounds of gutta-percha chips, and I continue the boiling until all these ingredients become thoroughly liquefied and amalgamated. After this is accomplished I allow the temperature to fall to about the heat at which boiling commences, and then I introduce about eight (8) pounds of gum-shellac and stir the mass until the shellac is thoroughly amalgamated with the rest of the mass. The temperature is lessened so that the strength of the shellac will not be impaired. Next I introduce about two (2) gallons of copal (oil) varnish and one (1) gallon of dammar varnish. The caoutchouc gum can be dissolved by the use of benzine, ether, or analogous material and the gutta-percha by the use of turpentine; but as these solvents are very volatile I cannot bring the mass of ingredients to the desired degree of heat without incurring danger of their taking fire. When the copal varnish and the dammar varnish have been properly amalgamated with the mass I pour into the mass the heated linseed-oil. This must be done quite slowly to avoid precipitation ensuing, and the mass must be constantly stirred meanwhile, until the whole is partially cooled, and at least to below the scalding-point—say to about 110° to 115°. Then the mass is drawn off into casks or cans, ready for mixing with a body-filling and drier, such as that hereinafter described.

I will remark that it is of cardinal importance in order to make this paint or base material for paint successfully that each of its ingredients should, in its preparation, be brought to a degree of heat higher than that which it will be subjected to in use from the rays of the sun.

For a fire-proof body-filling and drier I preferably use the following: I take about one hundred and fifty (150) pounds of metallic ore, pulverized, about fifteen (15) pounds of hydrate of calcium, or a suitably smaller quantity of manganese, about twelve (12) pounds of calcined plaster, commercially known as "calcined plaster-of-paris," or "kiln-dried plaster-of-paris," about five (5) pounds of boiled whiting, also commercially known as "kiln-dried whiting," about three (3) pounds of oxide of lead or ordinary red litharge, and, preferably, about two (2) pounds of water-cement. These materials may be calcined, boiled, or roasted. About five (5) pounds of this body-filling and drier should be used with each gallon of the paint or base material of the paint to make the completed paint. This completed paint, which I designate "gutta percha paint," will not blister or melt when exposed to the sun, nor will it crack or break in winter. Being composed of elastic materials it will not be injuriously affected by the expansion and contraction of the material to which it is applied, nor even by the bending of the same. It is, moreover, very strong and durable, and it will not evaporate save in the natural process of drying. It is admirably adapted for use upon tin roofs, on iron bridges, and other structures, on iron fronts of buildings, on iron shutters, and on various analogous articles. It forms a very superior protection to the articles on which it may be used, owing to its strength and durability, as well as its adaptability to expand, contract, and change form with such articles.

I desire to remark that in lieu of the pine-tar referred to I may use coal-tar, gas-tar, pitch, or asphaltum, and that I may use roasted pulverized soap-stone in lieu of the metallic ore before mentioned.

What I claim as my invention, and desire to secure by Letters Patent, is—

The paint or base for a paint composed of pine-tar, rosin-oil, pure caoutchouc gum, gutta-percha chips, gum-shellac, copal (oil) varnish, dammar varnish, and boiled linseed-oil or their equivalents, all treated and combined substantially as and in about the proportions herein set forth.

ATWATER E. BROCKETT.

Witnesses:
H. L. BAKER,
BENJAMIN L. DENNIS.